Patented Jan. 3, 1950

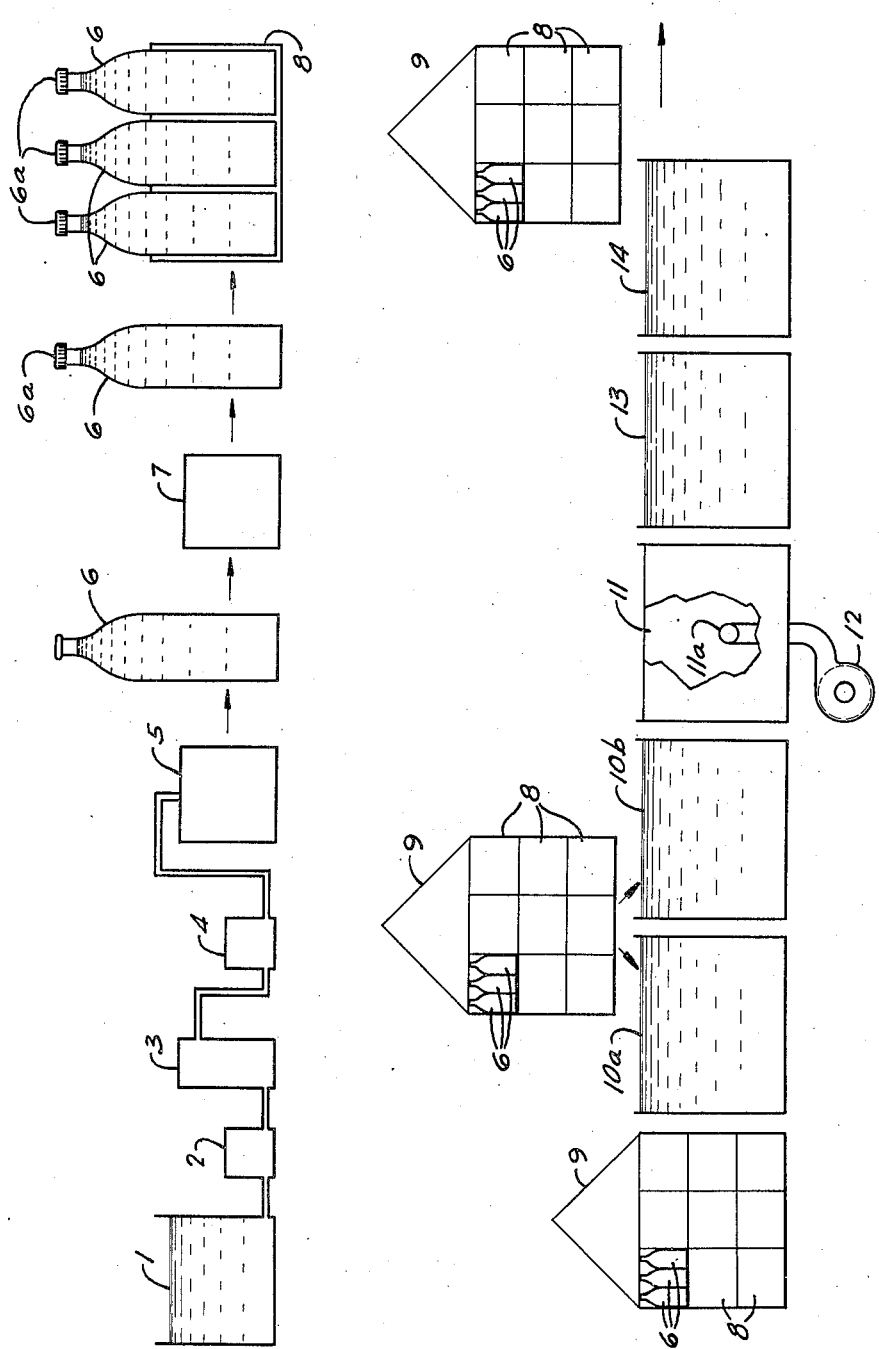

2,493,663

UNITED STATES PATENT OFFICE 2,493,663

PROCESS FOR HEAT-TREATING MILK AND CREAM IN CONTAINERS

James Owen Fowler, Sparkhill, Birmingham, England

Application December 22, 1945, Serial No. 637,061
In Great Britain November 6, 1945

2 Claims. (Cl. 99—214)

This invention has reference to a new or improved process for heat treating milk and cream which is required to be sold in bottles.

It is the general practice in the preparation of heat treated milk which is to be sold in bottles first to filter the raw milk as received, then to subject the filtered milk to heat treatment in bulk and subsequently to bottle the treated milk. This practice is open to the objection however that contamination can and in fact is known to take place during cooling and bottling and hence the object of the present invention is to provide a new or improved process for heat treating milk which ensures that bottled milk as supplied to a consumer is free from contamination.

According to the invention the new or improved process for heat treating milk and cream which is required to be sold in bottles resides in bottling either cold or after a preliminary heating, milk which has been filtered or otherwise purified or the cream, sealing the bottles and then subjecting the sealed bottles and contents to heat treatment preferably by immersion in hot water for a predetermined period of time, removing the sealed bottles and contents after the heat treatment aforesaid and permitting of a degree of cooling of the bottles by admitting of evaporation from the external surfaces of the bottles of the moisture film which clings to the bottles then subjecting the bottles and contents to cooling and chilling preferably by immersion.

The invention also resides in the details of the improved process for heat treating milk to be described hereinafter.

The preferred manner of carrying the invention into effect as applied to the treatment of milk will now be described with particular reference to the accompanying diagram.

The raw milk as received is emptied into the tank 1 from which it is forced by a pump 2 through a filter 3 of known construction. The filtered milk is then passed by way of a float controlled constant level vessel 4 to the supply tank of a bottling plant of the vacuum filler type of known construction indicated by the reference numeral 5. In this bottling plant 5 the bottles 6 are filled to a level which allows for expansion during the heat treatment.

After filling the bottles 6 are passed to a capping machine of known kind which is denoted by the reference numeral 7 and which seals the bottles with caps 6a of the kind known in commerce as crown seals.

After sealing the bottles 6 are placed in particular milk crates 8 of known kind and a number of crates to constitute a batch say for example 27, are then packed on a cradle 9.

At the appointed time this cradle 9 is hoisted by an electric winch and subsequently lowered into and immersed in one or other of the tanks 10a or 10b which contain water which is heated to a temperature of 152°–155° F. The electric winch incorporates a two speed gear which permits immersion to take place slowly.

The sealed bottles 6 and contents are held in one or other of the tanks 10a, 10b at the temperature aforesaid for a period of thirty minutes after which the bottles 6 are transferred quickly into a conditioning chamber 11 which is a simple open topped tank having in one end an opening 11a which is in communication with the outlet from an electrically driven fan 12.

The bottles and their contents still packed in crates 8 in a cradle 9 remain in the chamber 11 for a period of four minutes in still air after which the fan 12 is started up and the induced current of air allowed to circulate around the bottles for a period of one minute.

If conditioned air is used say at a temperature of 110° F. the bottles can remain in still air for two minutes and in circulated air for a period of three minutes.

When first placed in the conditioning chamber 11 the hot water which clings around the outsides of the bottles 6 evaporates thus producing a cooling effect on the structure of the bottles 6 which allows of the outer layers of the bottle walls contracting before the inner layers and thus eliminating the danger of fracture of the bottles by too rapid cooling.

Further this initial cooling prevents the formation of a skin on the surface of the milk in a bottle 6 so eliminating the possibility of impairing the taste of the treated milk which would otherwise obtain if this formation of skin was allowed to take place.

After the cooling in the air current the cradle 9 with the partially cooled bottles is lowered into and immersed in a tank 13 of cooling water which is maintained at a temperature of between 85° and 90° F.

The bottles are kept in this cooling tank for a period of twenty minutes after which they are removed and immersed in a final chilling tank 14 of water maintained at a temperature of between 40° and 50° F.

The bottles remain in the chilling tank 14 for a period of twelve to fifteen minutes after which they are removed and are then ready for despatch to consumers preferably by the cradle 9 being lowered on to a waiting vehicle.

Preferably for large scale working and as illustrated two holding tanks 10a, 10b are used operating with a time difference of fifteen minutes so that a cradle 9 is ready to be passed to the conditioning chamber 11 every fifteen minutes thus expediting production.

Although the initial cooling of the bottles 6 is preferably allowed to take place in the conditioning chamber 11 as described hereinbefore provision may be made for this cooling to take effect in other ways for example after the lifting of the cradle 9 from a holding tank 10a or 10b a conveyor means may be provided for conveying the cradle 9 from a holding tank 10a or 10b to the tank 13 at a speed and under conditions which permits of the cooling of the outer layers of the bottle structure by the evaporation of the water film clinging to the bottles as aforesaid.

After a set period of cooling the bottles may either be lowered into the first cooling tank 13 or alternatively passed through a passage or chamber into which water is sprayed for producing a like cooling effect in which event after the cooling by the sprays the bottles are required to be lowered only into a chilling tank 14.

The heat and cooling operations are preferably controlled by visible record temperature indicators.

In order to ensure still air conditions within the chamber 11 when the fan 12 is not working the opening 11a is normally closed by a one way rubber flap valve which effectively closes the said opening 11a when the fan 12 is not working but which is opened automatically by the air blast when the fan 12 is started.

In a modification the conditioning chamber 11 may be provided oppositely to the opening 11a with doors preferably swing doors which are opened when the fan 12 is brought into operation.

It will be appreciated that after bottling there is no possibility of contamination and that the subsequent process enables heat treatment to be carried out efficiently without risk of fracture of the bottles or the formation of skin on the surface of the milk after heat treatment.

It will be appreciated also that cold bottling of milk is generally to be preferred as this method of bottling helps to preserve the flavour and nutritive value of the milk but if desired the milk may be heated in bulk prior to bottling.

It will be appreciated further that the invention is not limited to treatment at the temperaures or for the periods stated as these may be varied as may be required and that the process may be applied also to the heat treatment of cream which previously has been separated from milk.

I claim:

1. A process for pre-conditioning bottles containing lacteal fluids for cooling after pasteurization has been effected by immersion in a pasteurizing tank, that comprises moving each batch directly from the pasteurizing tank to a zone having a substantially moisture free, controlled, still atmosphere held at a temperature of from about 40° F. to about 50° F. cooler than the pasteurizing bath, holding each batch in such zone for a period of from about two minutes to about four minutes to evaporate a substantial portion of the film of heated water from the exterior of the bottles and to partially contract the outer surface of the bottles relative to the inner surface and then moving each batch to and immersing it in a chill tank having a temperature approximately equal to that of the still atmosphere.

2. A method of heat treating lacteal fluids in glass bottles that comprises bottling the fluid in incompletely filled bottles, sealing the bottles against moisture and air, assembling a plurality of filled and sealed bottles in a batch, immersing each separate batch individually in a pasteurizing bath for a period of time long enough to effect pasteurization of the fluid contained in the bottles, removing the batch of bottles from the bath, holding the batch in a still atmosphere for a period of time sufficient to evaporate a substantial portion of the film of heated water adhering to the exterior of the bottles by the passage of heat from the interior of the bottles to partially contract the exterior surfaces of the bottles, and circulating such atmosphere at the same temperature for a period of from about one to about three minutes to further cool by convection the exterior of the bottles and then immersing each batch of bottles separately in each of a series of baths having successively lower temperatures.

JAMES OWEN FOWLER.

REFERENCES CITED

The following references are of record in the file of this patent:

UNITED STATES PATENTS

| Number | Name | Date |
|---|---|---|
| 749,547 | Fesenmeier | Jan. 12, 1904 |
| 1,077,270 | Gettelman | Nov. 4, 1913 |
| 1,115,248 | Schier | Oct. 27, 1914 |

OTHER REFERENCES

Heineman, "Milk," pages 522 through 528. Published 1919 by W. B. Saunders Company, Philadelphia.